US006866075B2

(12) United States Patent
Whitley et al.

(10) Patent No.: US 6,866,075 B2
(45) Date of Patent: Mar. 15, 2005

(54) METHOD AND APPARATUS FOR UNIFORM PARTICLE LOADING OF VESSELS

(75) Inventors: Roger Dean Whitley, Allentown, PA (US); Stephen Clyde Tentarelli, Macungie, PA (US); David Ross Graham, Lansdale, PA (US); Craig E. Steigerwalt, Slatington, PA (US); Luigi Depari, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/215,463

(22) Filed: Aug. 9, 2002

(65) Prior Publication Data

US 2004/0025966 A1 Feb. 12, 2004

(51) Int. Cl.[7] .................................................. B65B 1/04
(52) U.S. Cl. .......................... 141/286; 141/34; 141/100
(58) Field of Search .......................... 141/1, 9, 34, 100, 141/286; 414/299, 301, 302; 239/7, 665–669, 672–674, 677, 687–689

(56) References Cited

U.S. PATENT DOCUMENTS

| | | | | |
|---|---|---|---|---|
| 3,265,225 A | * | 8/1966 | Louks | 414/302 |
| 3,285,438 A | | 11/1966 | Howell et al. | 214/17 |
| 3,972,686 A | | 8/1976 | Johnson et al. | 23/288 |
| 4,040,529 A | * | 8/1977 | Wurdeman et al. | 414/301 |
| 4,159,785 A | | 7/1979 | Berry, Jr. | 222/63 |
| 4,162,960 A | * | 7/1979 | Dhondt | 208/407 |
| 4,239,424 A | * | 12/1980 | Pavolka | 406/157 |
| 4,300,725 A | | 11/1981 | Moherek | 239/684 |
| 5,028,007 A | | 7/1991 | Wokal | |
| 5,296,202 A | * | 3/1994 | Souers et al. | 422/219 |
| 5,324,159 A | | 6/1994 | Noobilski et al. | 414/301 |
| 5,607,893 A | | 3/1997 | Diekmann | 502/439 |
| 5,819,820 A | | 10/1998 | Lehman | 141/100 |
| 5,836,362 A | | 11/1998 | Ackley et al. | 141/286 |
| 5,964,259 A | | 10/1999 | Ackley et al. | 141/286 |
| 6,082,639 A | | 7/2000 | Pentz et al. | |
| 2002/0179745 A1 | | 12/2002 | Dolan et al. | |

FOREIGN PATENT DOCUMENTS

| | | | |
|---|---|---|---|
| EP | 0 596 256 A1 | 5/1994 | |
| EP | 1 074 493 A1 | 2/2001 | |
| EP | 1074493 | 2/2001 | ........... B65G/69/04 |
| EP | 1188470 | 3/2002 | ........... B01D/53/04 |
| FR | 1.299.568 | 6/1962 | |
| JP | 6118430 | 1/1986 | ............. B01J/8/02 |
| WO | WO01/23080 | 4/2001 | ............. B01J/8/02 |

OTHER PUBLICATIONS

E. Dessen, G. Rynteit, and Y. Haquet, "Dense Loading of Catalysts in Ammonia Plants", Ammonia Plant Safety, vol. 33, pp. 18–29 (1993).

A. I. Snow and M. P. Grosboll, "Good catalyst loading benefits operations", *Oil and GasJjournal*, 75(21), pp. 61–65, May 23, 1977.

J. T. Wooten, "Dense and sock ctalyst loading compared", *Oil and Gas Journal*, 96(41), pp. 66–70, Oct. 12, 1998.

M. F. Mathias and G. P. Muldowney, "Effect of solids loading method on bed porosity and gas flux distribution in a fixed–bed reactor", *Chemical Engineering Science*, 55(2000), pp. 4981–4991.

* cited by examiner

*Primary Examiner*—J. Casimer Jacyna
(74) *Attorney, Agent, or Firm*—John M. Fernbacher

(57) ABSTRACT

Apparatus for dispersing particles flowing from an orifice comprising a deflecting surface disposed relative to the orifice, wherein the deflecting surface is fixed relative to the orifice, whereby particles flowing from the orifice can impinge upon and can be dispersed by the deflecting surface, wherein the orifice is one of a plurality of orifices disposed in a wall of a conduit, and wherein the conduit has an axis which is oriented between about 45 degrees and about 70 degrees from the vertical such that particles can flow through the conduit and through the orifices by gravity.

27 Claims, 8 Drawing Sheets

METHOD AND APPARATUS FOR UNIFORM PARTICLE LOADING OF VESSELS

BACKGROUND OF THE INVENTION

The uniform flow of fluids through packed beds of particulate material is important for the efficient operation of pressure or temperature swing adsorption systems and fixed-bed chemical reaction systems. Any significant radial variation of the fluid axial velocity will reduce effective fluid-solid contacting, thereby reducing the product purity and recovery in adsorption systems and reducing the overall conversion in a chemical reactor. The uniform flow of fluids through a packed bed of particulate material can be realized by careful loading of the particulate material into a vessel to form a dense, uniform bed with a consistent and minimum bed porosity.

Different types of particle loading methods have been utilized in the art to form particulate beds in vessels. The first and oldest of these methods is dump loading, in which the particulate material is simply poured into the vessel and manually leveled. There is no control over the bed uniformity in this method and the particles are not well settled, even though vibration can be used during or after dumping to settle the bed. Because a dense, uniform bed is not formed, this method does not guarantee a uniform radial distribution of fluid flowing through the bed.

A second method has been used in which a particulate bed is built by depositing a succession of bulk layers of particles in a vessel. One well-known version is the sock loading method, which uses a chute or flexible tube to transport particles from a hopper above the vessel to the surface of the bed. As the vessel is filled, the chute is raised until the bed installation is complete. This method does not yield a dense, uniform bed because the particles are randomly oriented and are subject to uneven settling.

A third method, radial dispersion, has been used in which the particles are thrown radially outward from a rotating dispersing device and then fall essentially as individual particles to the bed surface. In this method, a stream of particles is dropped onto a rotating apparatus, such as a plate or series of horizontal rods, and the rotating apparatus breaks up the particle stream and imparts radial motion to the individual particles as they fall to the surface of the bed. By making the particles fall individually, the radial dispersion method allows for dense loading, but the particle dispersion over the bed surface is random, so the final bed surface may not be uniform.

A fourth method of particle loading is described as dispersed dropping. In this method, the particles are passed through one or more holes and dispersed over the bed surface. The holes may be either stationary or moving relative to the bed. In one version, a series of fixed plates with increasing numbers of holes breaks the particle flow into smaller and smaller streams. While the final particle substreams may be uniform, the particles do not fall individually unless the drop height is large. As the surface of the bed rises, the drop height decreases, and the packing density decreases as a result. More recent versions of the dispersed dropping method utilize hollow rotary arms with spaced holes through which particles flow and drop to the bed surface as the arms rotate above the bed. This method results in dense, uniform beds and is a generally preferred method for particle loading.

In the dispersed dropping method of particle loading used in the art, particles typically are distributed by flow through a large number of small orifices to achieve the desired degree of dispersal. Dispersal through a smaller number of larger orifices would be desirable if proper loading dispersion could be achieved. The present invention, which is disclosed below and defined by the claims which follow, offers an improved method of dispersed dropping by means of rotary arms which utilize a combination of relatively large orifices and adjacent particle dispersal assemblies to effect uniform dispersal of particles to form a dense, uniform bed in a vessel.

BRIEF SUMMARY OF THE INVENTION

The invention relates to an apparatus for dispersing particles flowing from an orifice comprising a deflecting surface disposed relative to the orifice, wherein the deflecting surface is fixed relative to the orifice, whereby particles flowing from the orifice can impinge upon and can be dispersed by the deflecting surface.

The orifice may be one of a plurality of orifices disposed in a wall of a conduit wherein the conduit has an axis which is oriented between about 45 degrees and about 70 degrees from the vertical such that particles can flow through the conduit and through the orifices by gravity.

In another embodiment, the invention includes an apparatus for loading particles into a vessel comprising (a) particle hopper storage means and (b) at least one rotary loading arm comprising a conduit having a first end and a second end, wherein the first end is in particle flow communication with the particle hopper storage means, and wherein a portion of the conduit has a plurality of orifices disposed between the first and the second end.

In this embodiment, the invention includes (c) a plurality of particle dispersal assemblies, each particle dispersal assembly being disposed adjacent to an orifice, wherein each particle dispersal assembly comprises a deflecting surface which is fixed relative to the orifice such that particles flowing from the orifice can impinge upon and can be dispersed by the deflecting surface; and (d) drive means for rotating the at least one rotary loading arm.

In this apparatus, each particle dispersal assembly may further comprise a dispersing surface disposed adjacent to the orifice such that the projection of the orifice does not intersect the deflecting surface, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface. The deflecting and dispersing surfaces may be planar.

The axis of the conduit at the location of any of the plurality of orifices typically forms an included angle with the plane of the deflecting surface of between about 20 and about 45 degrees. Each deflecting and dispersing surface preferably is attached to the portion of conduit adjacent to an orifice. The axis of the conduit typically is oriented between about 45 degrees and 70 degrees from the vertical. The particle loading apparatus may comprise two diametrically opposed rotary loading arms. The conduit typically is selected from the group consisting of a pipe, a tube, a channel, and combinations thereof. The apparatus may further comprise control means for controlling the rotation rate of the rotary loading arm. The hopper storage means may include a storage assembly comprising a cylindrical vessel with an attached frusto-conical bottom section having a bottom cylindrical section attached thereto, wherein the rotary loading arm is attached to the bottom cylindrical section such that the drive means rotates both the rotary loading arm and the storage assembly.

The invention also includes a method for loading particles into a vessel comprising (a) providing a particle storage hopper containing the particles;

(b) providing at least one rotary loading arm comprising a conduit having a first end and a second end, wherein the first end is in particle flow communication with the particle storage hopper, and wherein a portion of the conduit has a plurality of orifices disposed between the first and the second end;

(c) providing a plurality of particle dispersal assemblies, each particle dispersal assembly being disposed adjacent to an orifice; wherein each particle dispersal assembly comprises (1) a deflecting surface disposed adjacent to the orifice, whereby particles flowing from the orifice can impinge upon and can be deflected by the deflecting surface; and (2) a dispersing surface disposed adjacent to the orifice, wherein a plane tangent to any point on the deflecting surface and a plane tangent to any point on the dispersing surface intersect at an included angle of between about 30 degrees and about 60 degrees;

(d) flowing the particles through the rotary loading arm to the orifices, flowing the particles through the orifices, flowing particles vertically from the orifices, impinging at least a portion of the particles upon the deflecting surfaces, dispersing the particles from the deflecting surfaces, and further dispersing from the dispersing surfaces at least a portion of the particles dispersed from the deflecting surfaces; and (e) rotating the at least one rotary loading arm to distribute the particles in the vessel to form a bed of particles therein.

The at least one rotary loading arm preferably is rotated about the vessel axis. The at least one rotary loading arm may be rotated at between about 0.5 and 5 revolutions per minute. Following the completion of loading the bed of particles, a portion of the particles may be removed from the surface of the bed by vacuuming to level the bed surface. Alternatively, following the completion of loading the bed of particles, additional particles may be dispersed onto the surface of the bed by hand sifting.

Another embodiment of the invention includes an apparatus for controlling the loading of particles into a vessel comprising (a) particle hopper storage means;

(b) at least one rotary loading arm comprising a first section of pipe having a first end and a second end, wherein the first end is in particle flow communication with the particle hopper storage means, and wherein the first section of pipe has a plurality of orifices disposed between the first and the second end;

(c) a second section of pipe having an inner diameter larger than the outer diameter of the first section of pipe, wherein the second section of pipe is disposed coaxially and rotatably over the first section of pipe and has a plurality of orifices, wherein (1) in a first coaxial position the orifices in the second section of pipe are oriented relative to the orifices in the first section of pipe such that particles can flow through overlapping pairs of orifices in the first and second sections of pipe; and (2) in a second coaxial position the orifices in the second section of pipe are oriented relative to the orifices in the first section of pipe such that the orifices in the first section of pipe are blocked by the second section of pipe such that particles cannot flow through the orifices in the first section of pipe;

(d) a plurality of particle dispersal assemblies, each particle dispersal assembly being attached to the second section of pipe adjacent to an orifice; and (e) drive means for rotating the rotary loading arm to disperse the particles in the vessel.

In this apparatus, each particle dispersal assembly typically comprises a deflecting surface disposed adjacent to the orifice, wherein the deflecting surface is fixed relative to the orifice, whereby particles flowing vertically from the orifice can impinge upon and can be dispersed by the deflecting surface. In addition, the apparatus may include a dispersing surface disposed adjacent to the orifice such that the projection of the orifice does not intersect the deflecting surface. A plane tangent to any point on the deflecting surface and a plane tangent to any point on the dispersing surface typically intersect at an included angle of greater than about 30 degrees and less than about 60 degrees, whereby particles can be dispersed by the deflecting surface and at least a portion of the particles dispersed from the deflecting surface can impinge upon the dispersing surface and be dispersed by the dispersing surface.

In another embodiment of the invention, a method for controlling the loading of particles into a vessel comprises (a) providing a particle storage hopper;

(b) providing at least one rotary loading arm comprising a first section of pipe having a first end and a second end, wherein the first end is in particle flow communication with the particle storage hopper, and wherein the first section of pipe has a plurality of orifices disposed between the first and the second end;

(c) providing a second section of pipe having an inner diameter larger than the outer diameter of the first section of pipe, wherein the second section of pipe is disposed coaxially and rotatably over the first section of pipe and has a plurality of orifices, wherein (1) in a first coaxial position, the orifices in the second section of pipe are oriented adjacent to the orifices in the first section of pipe such that particles can flow through overlapping pairs of orifices in the first and second sections of pipe; and (2) in a second coaxial position, the orifices in the second section of pipe are oriented adjacent to the orifices in the first section of pipe such that the orifices in the first section of pipe are blocked by the second section of pipe such that particles cannot flow through the orifices in the first section of pipe;

(d) providing plurality of particle dispersal assemblies, each particle dispersal assembly being attached to the second section of pipe adjacent to an orifice;

(e) placing the first and second sections of pipe in the first coaxial position, thereby initiating flow of particles from the particle storage hopper through the first section of pipe, through the orifices in the first and second sections of pipe, and through the particle dispersal assemblies, and rotating the at least one rotary loading arm, thereby loading the particles into the vessel; and (f) placing the first and second sections of pipe in the second coaxial position, thereby terminating flow of particles into the vessel.

In this method, each particle dispersal assembly typically comprises a deflecting surface disposed adjacent to the orifice, wherein the deflecting surface is fixed relative to the orifice, whereby particles flowing vertically from the orifice can impinge upon and can be dispersed by the deflecting surface. In addition, each particle dispersal assembly typically includes a dispersing surface disposed relative to the orifice, wherein a plane tangent to any point on the deflecting surface and a plane tangent to any point on the dispersing surface intersect at an included angle of greater than about 30 degrees and less than about 60 degrees, whereby at least a portion of the particles which are dispersed by the deflecting surface impinge upon and are further dispersed by the dispersing surface.

The invention also includes an apparatus for loading particles into a vessel to form at least two annular beds containing different types of particles, the apparatus comprising:

(a) first particle hopper storage means containing a first type of particle;

(b) second particle hopper storage means containing a second type of particle;

(c) a first rotary loading arm comprising
  (1) a first conduit section having a first end and a second end, wherein the first end is in particle flow communication with the first particle hopper storage means and is disposed adjacent to the axis of the vessel, wherein the first conduit section has a plurality of orifices disposed between the second end and an intermediate point on the first conduit section, and wherein the intermediate point on the first conduit section is located at a selected radial distance from the vessel axis;
  (2) a plurality of particle dispersal assemblies, each particle dispersal assembly being disposed adjacent to an orifice in the first conduit section;

(d) a second rotary loading arm comprising
  (1) a second conduit section having a first end and a second end, wherein the first end is in particle flow communication with the second particle hopper storage means and is disposed adjacent to the axis of the vessel, wherein the second conduit section has a plurality of orifices disposed between the first end and an intermediate point on the second conduit section, and wherein the intermediate point on the second conduit section is located at the selected radial distance from the vessel axis, and
  (2) a plurality of particle dispersal assemblies, each particle dispersal assembly being disposed adjacent to an orifice in the second conduit; and (e) drive means for rotating the rotary loading arms to disperse the particles to form within the vessel a first annular bed containing the first type of particle and a second annular bed containing the second type of particle. In this apparatus, each particle dispersal assembly typically comprises
  (1) a deflecting surface disposed adjacent to the, whereby particles can flow vertically from the orifice, can impinge upon the deflecting surface, and can be dispersed by the deflecting surface; and
  (2) a dispersing surface disposed adjacent to the orifice, wherein a plane tangent to any point on the deflecting surface and a plane tangent to any point on the dispersing surface intersect at an included angle of between about 30 degrees and about 60 degrees, whereby at least a portion of the particles dispersed by the deflecting surface can impinge upon and be further dispersed by the dispersing surface.

The axes of the first and second conduit sections preferably are oriented between about 45 degrees and about 70 degrees from the vertical. The first and second rotary loading arms may be diametrically opposed.

The apparatus may further comprise an additional particle dispersal assembly disposed on the first conduit section adjacent to the intermediate point on the first conduit section and between the intermediate point on the first conduit section and the axis of the vessel. The apparatus may further comprise an additional particle dispersal assembly disposed on the second conduit section adjacent to the intermediate point on the second conduit section and between the intermediate point on the second conduit section and the inner wall of the vessel.

In a final embodiment, the invention includes a rotary loading arm for loading particles into a vessel comprising
  (a) a conduit section having a first end and a second end, wherein the first end is in particle flow communication with a supply of particles and is disposed adjacent to the axis of the vessel, wherein the second end is disposed adjacent to an inner wall of the vessel, and wherein the conduit has a plurality of orifices disposed between the first end and the second end; and
  (b) a plurality of particle dispersal assemblies, each particle dispersal assembly being disposed adjacent to an orifice in the conduit section; wherein each particle dispersal assembly comprises a deflecting surface disposed relative to the orifice such that particles can flow from vertically from the orifice can be dispersed by the deflecting surface;

wherein a plane tangent to the deflecting surface of any particle dispersal assembly intersects a plane tangent to the deflecting surface of an adjacent particle dispersal assembly at an included angle of between about 60 and about 90 degrees.

DETAILED DESCRIPTION OF THE INVENTION

The present invention is directed to improved apparatus and methods for loading particles into vessels to form dense, uniform beds for use in adsorbers and chemical reactors. Particles are loaded into a vessel by passing the particles through one or more rotary loading arms, each of which has a plurality of holes or orifices. Each orifice utilizes a particle dispersal assembly which comprises at least one deflecting surface to break up the particle stream leaving the orifice, after which the particles fall by gravity to the bed. Breaking up the particle stream by means of deflecting surfaces spreads the particle stream so that a greater area of the bed is covered by particles from each orifice. The use of deflecting surfaces also may serve to break up clumps of particles that naturally occur in flowing particles. Additional surfaces may be used to further disperse the particles.

The spacing, number, and size of the orifices in the rotary loading arms may be selected to achieve the desired rate of loading and also to achieve the required uniformity of loading over the entire cross-section of the vessel. The orifices may be relatively large, having diameters at least about 4 times the average diameter of the flowing particles, and may be in the range of about 4 up to about 12 times the average diameter of the flowing particles.

The invention may be used to load a single type of particle into a vessel to make a cylindrical bed having one or more layers of particles, wherein the bed treats a fluid in axial flow. Alternatively, several different types of particles may be loaded simultaneously into a vessel to make annular beds of particles, wherein an annular bed treats a fluid in radial flow. Different types of particulate material may be introduced through different rotary loading arms, and the configuration of the orifices and particle dispersal assemblies may be adjusted so that very little overlap occurs between adjacent annular layers. Alternatively, a mixed annular zone between two coaxial annular beds may be introduced by controlled mixing of the different types of particles simultaneously with the separate distribution of different types of particles to individual annular beds.

In an alternative embodiment of the invention, apparatus and methods for the precise starting and stopping of particle flow into a vessel is provided. This may be accomplished by using a rotary loading arm with coaxial pipes having orifices which can be superimposed to allow particle flow or radially offset to prevent particle flow. The outer coaxial pipe may be rotated to offset the orifices, thereby controlling particle flow through the orifices.

Figure 1:
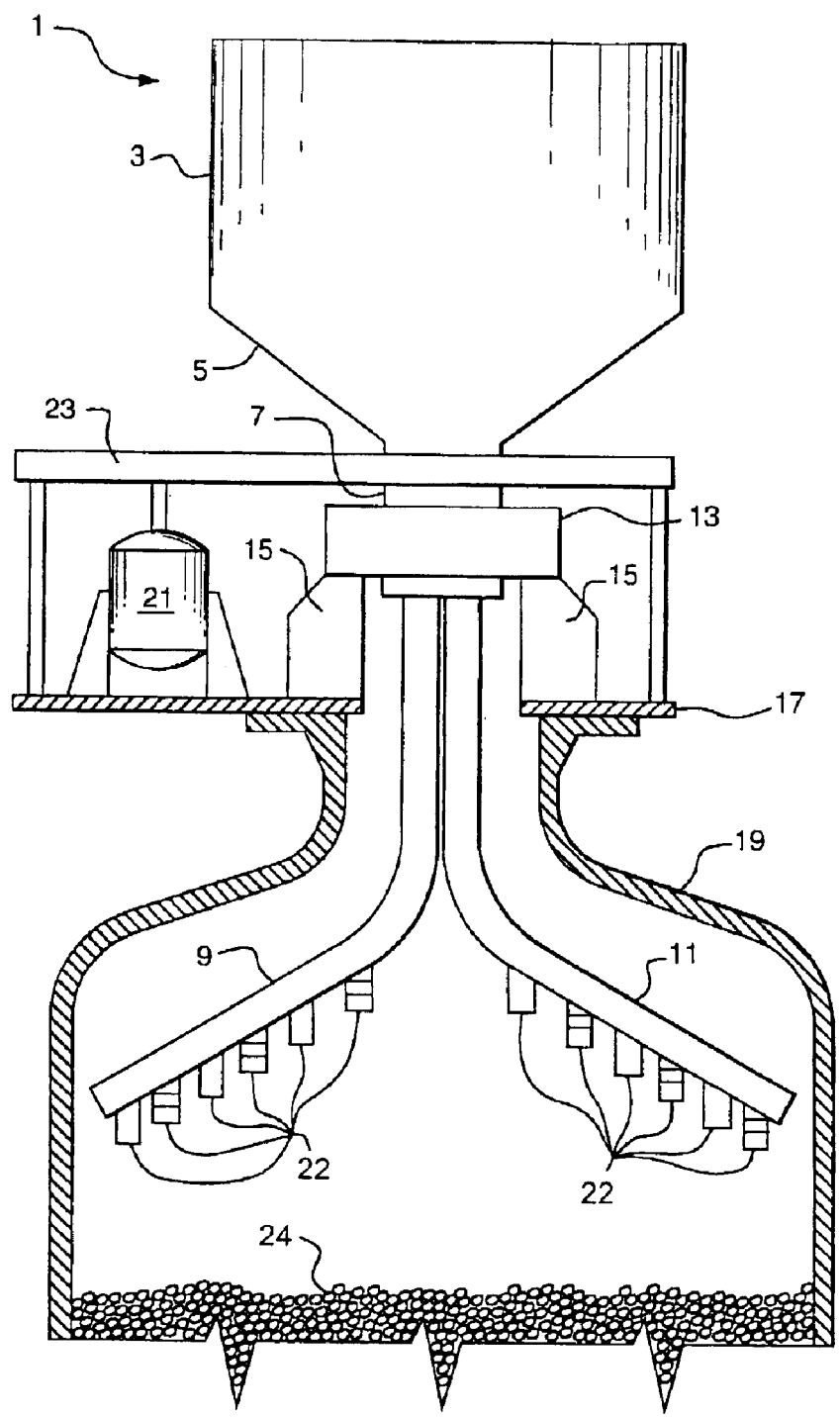
FIG. 1 illustrates an embodiment of the present invention for loading cylindrical beds including a particle hopper, rotary loading arm assemblies, and particle dispersal assemblies.

A first embodiment of the invention is shown in FIG. 1, which illustrates an exemplary particle loading system and the components thereof. The dimensions and orientation of the components in FIG. 1 are not necessarily to scale. Particle hopper storage means 1 includes cylindrical hopper 3, frusto-conical intermediate section 5, and bottom cylindrical section 7. First rotary loading arm 9 and second rotary loading arm 11 preferably are detachably joined to bottom cylindrical section 7. The distribution assembly comprising cylindrical hopper 3, frusto-conical intermediate section 5, bottom cylindrical section 7, and rotary loading arms 9 and 11 may be rotatably supported by bearing assembly 13. Bearing assembly 13 may be any type of bearing assembly known in the art which can support the weight of the distribution assembly and allow the entire assembly to rotate about a central axis. Bearing assembly 13 is supported in turn by supports 15 attached to support plate 17, which in turn rests on the upper entry flange of vessel 19. The rotary loading arms typically rotate about the axis of the vessel being filled with particles.

Motor 21 rotates the distribution assembly by means of a drive mechanism (not shown) within drive mechanism housing 23. The drive mechanism may be a belt drive, chain drive, gear drive, or any other type of rotary drive known in the art. Motor 21 is equipped with control means (not shown) to set and control the rotational speed of the distribution assembly. This control means preferably allows rotation of the distribution assembly at rotation rates between about 0.5 and about 5 revolutions per minute. The rotation rate should not impart any significant centrifugal forces on the particles, and the particles preferably fall mostly vertically by gravity after being dispersed by the particle dispersal assemblies.

Alternatively, bottom cylindrical section 7 may be rotatably connected to frusto-conical intermediate section 5 by means of a rotating seal (not shown) such that only bottom cylindrical section 7 and attached rotary loading arms 9 and 11 rotate while cylindrical hopper 3 does not rotate.

Each of rotary loading arms 9 and 11 has a plurality of orifices (not shown) in the lower surface of a portion of the arm between the outer end and the bend adjacent to the center line of the vessel, and the orifices are fitted with particle dispersal assemblies 22 (later described) which distribute particles from the orifices to form dense, uniform particle bed 24. For a typical vessel 19 having a diameter of 12 feet, each rotary loading arm typically has a portion which may be 6.4 to 8.5 feet long from the outer end to the bend adjacent to the center line of the vessel, and this portion of each rotary loading arm may have 10 to 30 orifices and associated particle dispersal assemblies. The segments of rotary loading arms 9 and 11 which contain the orifices typically are straight, but may have other shapes if desired.

The orifices may be of any shape but typically are circular holes. The ratio of the orifice diameter to the average particle diameter preferably is at least about 4, and may be in the range of about 4 to about 12. Each rotary loading arm comprises a conduit which may be formed from a pipe having a circular cross-section, a tube having a shape of any desired cross-section, or a channel which is open on the upper side, or combinations thereof. The rotary loading arms preferably are self-supporting, but may include reinforcing brackets or bracing as needed. The axis of the conduit forming each rotary loading arm typically is oriented between about 45 degrees and 70 degrees from the vertical. A useful angle has been found to be 60 degrees.

The particle loading system illustrated in FIG. 1 may be used to install a dense, uniform cylindrical bed of a single type of particles. Alternatively, the system may be used to install layers of different types of particles by loading the different types of particles sequentially into particle hopper storage means 1 and distributing the particles as described.

If required, following the completion of loading the bed of particles, a portion of the particles may be carefully removed from the surface of the bed by vacuuming to form a level and uniform bed surface. Alternatively, following the completion of loading the bed of particles, a hand sifter may be used to add particles to the surface of the bed to form a level and uniform bed surface. A level and uniform bed surface is important to ensure even flow distribution through the bed. Optionally, a perforated plate may be placed between the particulate bed and the rotary loading arms during the loading procedure. Adding this plate may damp out any small fluctuations in particle flow that may arise and would further distribute the particles falling to the surface of the bed during loading.

The particle loading system is installed prior to particle loading by first detaching rotary loading arms 9 and 11 from bottom cylindrical section 7. The remaining portion of the particle loading system is set upon the upper flange of vessel 19 and suitably attached thereto (not shown). Each of the rotary loading arms 9 and 11 is maneuvered between supports 15 into the interior of vessel 19 and connected to bottom cylindrical section 7. The particles are loaded into the vessel as described above, and upon completion of loading, rotary loading arms 9 and 11 are detached from bottom cylindrical section 7 and maneuvered out of the vessel between supports 15. The remaining portion of the particle loading system is removed from the upper flange of vessel 19, and the vessel is prepared for operation.

While the use of two rotary loading arms is described above, any number of loading arms may be used. For example, a single loading arm could be used with a diametrically-opposed counterweight as necessary. Alternatively, three or more loading arms could be used with holes staggered from arm to arm to reduce interference between adjacent particle streams on a given arm.

Figure 2:
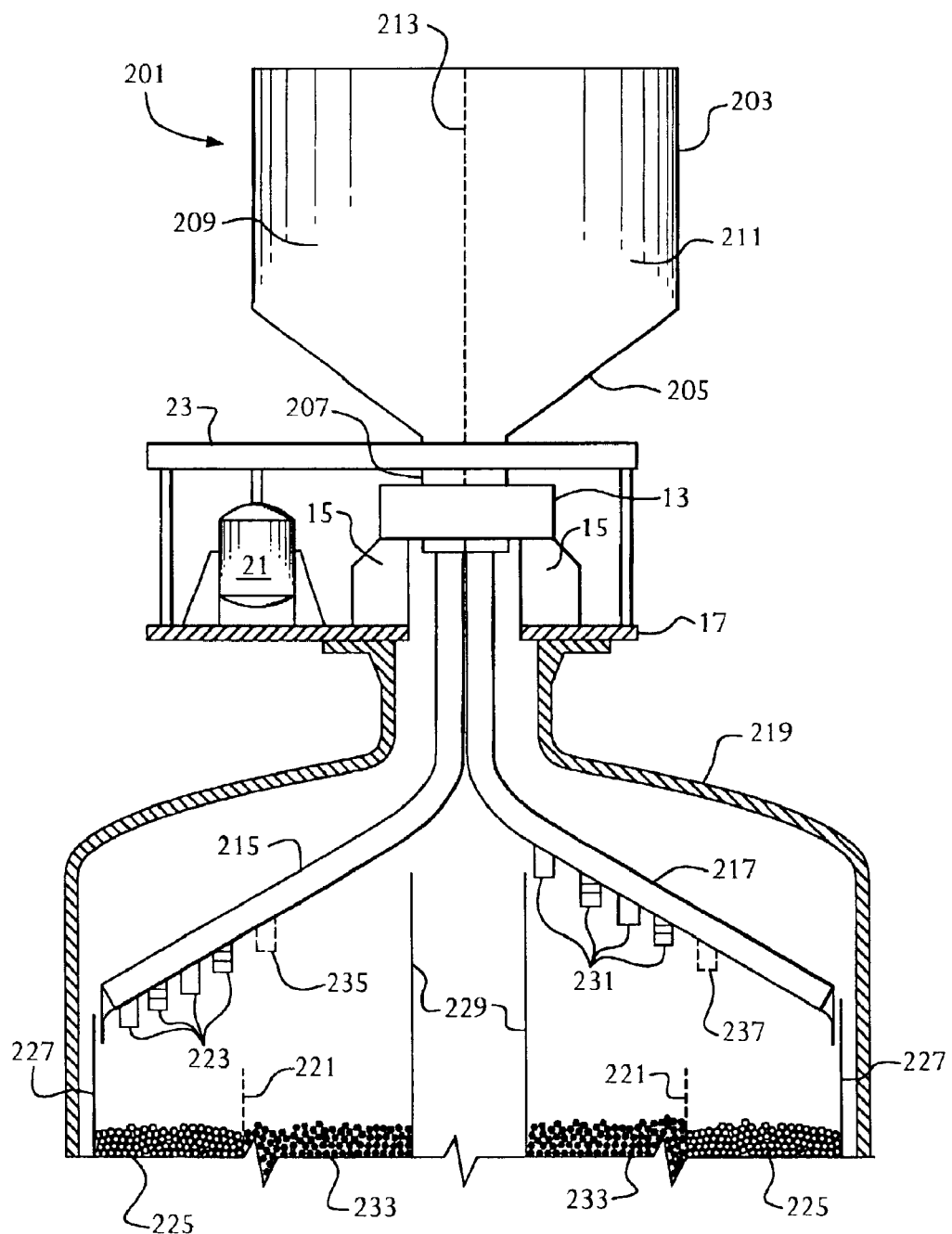
FIG. 2 illustrates an alternative embodiment of the present invention for loading annular beds including a particle hopper, rotary loading arm assemblies, and particle dispersal assemblies.

An alternative embodiment of the invention is shown in FIG. 2, which illustrates another exemplary particle loading system and the components thereof. The dimensions and orientation of the components in FIG. 2 are not necessarily to scale. Many of the components of FIG. 2 may be similar or identical to those of FIG. 1; for example, bearing assembly 13, supports 15, support plate 17, motor 21, and the drive mechanism in drive mechanism housing 23 may be the same as those in FIG. 1.

Particle hopper storage means 201 includes cylindrical hopper 203, frusto-conical intermediate section 205, and bottom cylindrical section 207. Particle hopper storage means 201 is divided into first particle storage volume 209 and second particle storage volume 211 by internal separating partition 213. First rotary loading arm 215 preferably is detachably joined to bottom cylindrical section 207 such that the arm is in particle flow communication with first particle storage volume 209. Second rotary loading arm 217 preferably is detachably joined to bottom cylindrical section 7 such that the arm is in particle flow communication with second particle storage volume 211.

Each of rotary loading arms 215 and 217 has a plurality of orifices (not shown) in the lower surface of the arm. The orifices in loading arm 215 are disposed between the inner wall of vessel 219 and intermediate point 221 (denoted by a dashed line), and the orifices are fitted with particle dispersal assemblies 223 (later described) which distribute a first type of particles from the orifices to form dense, uniform annular particle bed 225, sometimes described in the art as a radial bed. The outer surface of annular particle bed 225 may be supported by cylindrical partition 227. The orifices in rotary loading arm 217 are disposed between intermediate point 221 and the axis of vessel 219, and more specifically between intermediate point 221 and inner cylindrical partition 229. The orifices are fitted with particle dispersal assemblies 231 (later described) which distribute a second type of particles from the orifices to form dense, uniform annular particle bed 233.

For a typical vessel 219, for example having a diameter of 6 feet, each rotary loading arm would be 3.2 to 4.3 feet long from the outer end to the center line of the vessel. Rotary loading arm 215 typically has 5 to 15 orifices with the associated particle dispersal assemblies to distribute the first type of particles between intermediate point 221 and partition 227. The orifices and associated particle dispersal assemblies are spaced along each loading arm so that the density of the falling particles is uniform across the vessel cross-section containing annular bed 225. This criterion typically results in a spacing between adjacent particle dispersal assemblies which decreases as the radial distance from the vessel center increases. Rotary loading arm 217 typically has 5 to 15 orifices with the associated particle dispersal assemblies to distribute the second type of particles between intermediate point 221 and cylindrical partition 229. The orifices and associated particle dispersal assemblies are spaced along each loading arm so that the density of the falling particles is uniform across the vessel cross-section containing annular bed 233. This criterion typically results in a spacing between adjacent particle dispersal assemblies which decreases as the radial distance from the vessel center increases. The segments of rotary loading arms 215 and 217 which contain the orifices typically are straight, but may be curved if desired.

Each rotary loading arm comprises a conduit which may be formed from a pipe having a circular cross-section, a tube having a shape of any desired cross-section, or a channel which is open on the upper side, or combinations thereof. The rotary loading arms preferably are self-supporting, but may include reinforcing brackets or bracing as needed. The axis of the conduit forming each rotary loading arm typically is oriented between about 45 degrees and 70 degrees from the vertical. A useful angle has been found to be 60 degrees.

Optionally, an additional particle dispersal assembly 235 may be installed on rotary loading arm 215 to effect the formation of an intermediate mixed particle zone (not shown) between annular beds 225 and 233. This mixed layer would contain the two types of particles provided from first particle storage volume 209 and second particle storage volume 211 respectively. Alternatively and optionally, an additional particle dispersal assembly 237 may be installed on rotary loading arm 217 to effect the formation of an intermediate mixed particle layer between annular beds 225 and 233. This mixed layer also would contain the two types of particles provided from first particle storage volume 209 and second particle storage volume 211. In yet another optional alternative, additional particle dispersal assemblies 235 and 237 could be used in combination to form an intermediate mixed particle layer.

The particle loading system is installed prior to particle loading by first detaching rotary loading arms 215 and 217 from bottom cylindrical section 207. The remaining portion of the particle loading system is set upon the upper flange of vessel 219 and suitably attached thereto (not shown). Each of the rotary loading arms 215 and 217 is maneuvered between supports 15 into the interior of vessel 219 and connected to bottom cylindrical section 207. Particles of the first type are loaded into first particle storage volume 209 and particles of the second type are loaded into second particle storage volume 211. Particles of the first and second types are loaded simultaneously into the vessel, thereby forming two annular beds 225 and 233 as described above. Upon completion of loading, rotary loading arms 215 and 217 are detached from bottom cylindrical section 207 and maneuvered out of the vessel between supports 15. The remaining portion of the particle loading system is removed upper flange of vessel 219, and the vessel is prepared for operation.

Any type of particle can be loaded using the methods described above with reference to FIGS. 1 and 2. Such particles may include, for example, granular, extruded, beaded, or pelleted forms of adsorbents or catalysts for any adsorption or catalytic reaction application. Typically the methods can be applied to particles having average diameters of 0.1 to 5.0 mm The term "type of particle" or "particle type" means particles which have similar physical and chemical properties and are characterized by a specific particle size distribution. The term "different types of particles" means that two or more groups of particles differ in one or more of physical properties, chemical properties, and size distribution.

Figure 3A:
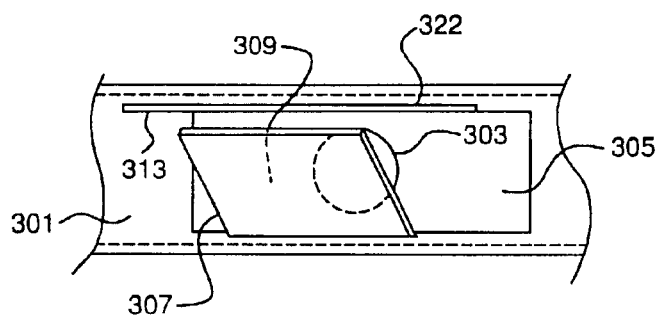
FIGS. 3A, 3B, and 3C illustrate several views of a particle dispersal assembly.
Figure 3B:
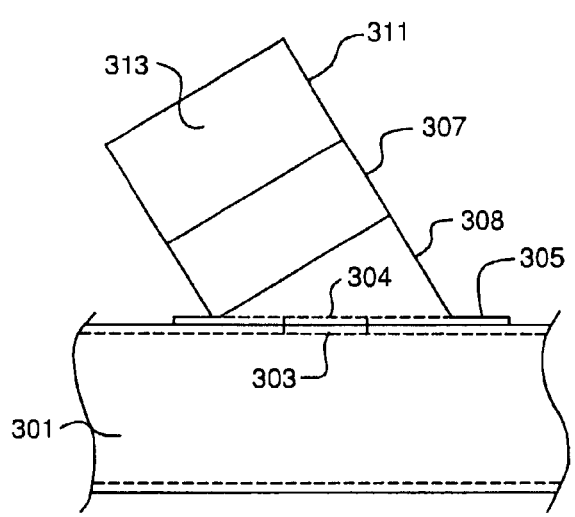
Figure 3C:
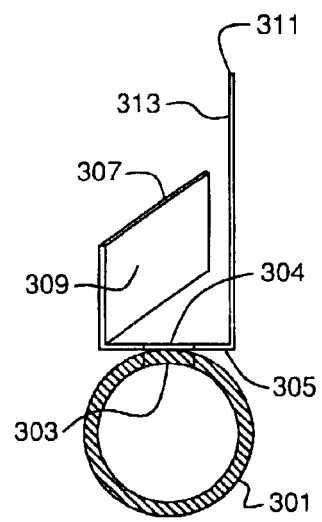

An exemplary particle dispersal assembly used as described above is illustrated in the three views of FIGS. 3A, 3B, and 3C. This particle dispersal assembly is representative of any of particle dispersal assemblies 22 of FIG. 1 and particle dispersal assemblies 223, 231, 235, and 237 of FIG. 2. The dimensions and orientation of the components in FIGS. 3A, 3B, and 3C are not necessarily to scale. FIG. 3A is a normal view of a particle dispersal assembly attached to the bottom surface of typical conduit 301 which is part of a rotary loading arm. Orifice 303 in conduit 301 allows particles from the inside of the conduit to flow by gravity through the orifice and by gravity through the particle dispersal assembly. The particle dispersal assembly in this example may be made of sheet material such as metal and has generally planar components. Base 305, which typically is attached to conduit 301, also has an orifice which is generally congruent with orifice 303 in conduit 301. Tab 307 is attached to base 305. Deflecting surface 309 on the underside of tab 307 is located relative to orifice 303 such that particles flowing from orifice 303 impinge on deflecting surface 309 and are dispersed. This is so because conduit 301 is oriented at an angle from the vertical (see for example rotary loading arms 9 and 11 of FIG. 1), and therefore a vertical projection of orifice 303 will intersect deflecting surface 309. While it is desirable that all particles flowing from orifice 303 impinge on deflecting surface 309, it is possible that a small number of particles may have unusual trajectories such that they do not impinge on this surface.

FIG. 3B is a side view of FIG. 3A which shows an edge view of base 305 which typically is attached to conduit 301. Orifice 303 in conduit 301 and orifice 304 in base 305 are shown to be essentially congruent. Tab 307 is attached to base 305 by triangular connecting segment 308. Tab 311 lies partially behind tab 307 and triangular connecting segment 308 in this view, and dispersing surface 313 is seen in normal view. Particles flowing from orifices 303 and 304 impinge on deflecting surface 309 (on the back side of tab 307) and are deflected and dispersed. At least a portion of the particles that are dispersed by deflecting surface 309 impinge upon and are further dispersed by dispersing surface 313, wherein the dispersed particles flow through the gap between the edge of tab 307 and surface 313 of tab 311 and fall by gravity to the surface of the bed.

An end view of FIG. 3B is given in FIG. 3C. Base 305 having orifice 304 typically is attached to conduit 301 having orifice 303. Tab 307 having deflecting surface 309 (not shown-see FIG. 3A) is attached to base 305 by triangular connecting segment 308 (shown here in edge view). Tab 311 having dispersing surface 313 is attached to base 305. At least a portion of the particles that are dispersed by deflecting surface 309 (FIG. 3A) impinge upon and are further dispersed by dispersing surface 313. Particles flow through the gap between the edge of tab 307 and surface 313 of tab 311. The width of this gap typically is greater than two times the average diameter of the particles being dispersed.

Based on the above description, a deflecting surface is defined as the first surface impinged by particles flowing from the orifice. The deflecting surface may serve as the sole particle dispersing means for the orifice if desired. The dispersing surface is defined as a second surface which is impinged by at least a portion of the particles dispersed from the first surface. The terms "disperse", "dispersing" and "dispersed" describe the impingement of particles on a surface and the resulting deflection and distribution of the particles after impingement.

Figure 4:
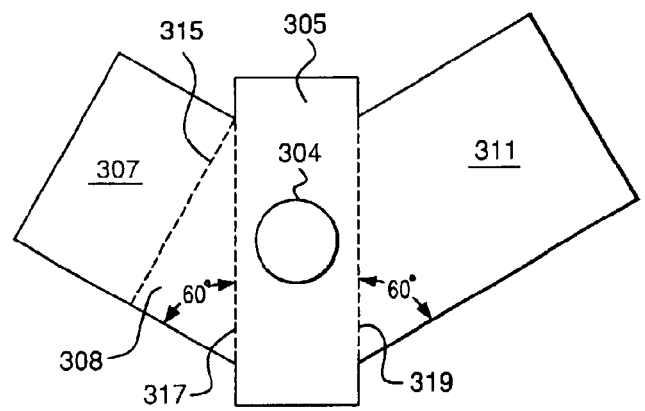
FIG. 4 is a diagram of a template for fabrication of a particle dispersal assembly.

The particle dispersal assembly illustrated in FIGS. 3A, 3B, and 3C may be fabricated, for example, from a planar template of sheet material shown in FIG. 4. The dimensions and orientation of the components in FIG. 4 are not necessarily to scale. The template includes portions for base 305, tab 307 which forms deflecting surface 309, tab 311 which forms dispersing surface 313, and triangular connecting segment 308. Orifice 304 is formed in base 305. The particle dispersal assembly is formed by bending tab 307 along dashed line 315 upward at an included angle of between 30 and 60 degrees relative to triangular connecting segment 308, bending triangular connecting segment 308 upward along dashed line 317 at an included angle of approximately 90 degrees relative to base 305, and bending tab 311 upward along dashed line 319 at an included angle of approximately 90 degrees relative to base 305. In one embodiment, the included angle between tab 307 and triangular connecting segment 308 is about 45 degrees, the included angle between triangular connecting segment 308 and base 305 is about 90 degrees, and the included angle between tab 311 and base 305 is about 90 degrees. After bending is complete to form the particle dispersal assembly, the plane of tab 307 intersects the plane of tab 311 at an included angle of between about 30 and about 60 degrees.

Based on the relative angles between the components of the particle dispersal assembly discussed above, the axis of the conduit at the location of any of the plurality of orifices will form an included angle with the plane of the deflecting surface of between about 20 and about 45 degrees. This angle depends on the included angle between tab 307 and triangular connecting segment 308 (FIG. 3), which can vary between 30 and 60 degrees, as well as the included angle between base 305 and the outer side of triangular connecting segment 308 (FIG. 4), which can vary between 20 and 45 degrees.

When the template is flat before being formed into the particle dispersal assembly, the included angle between base 305 and the outer side of triangular connecting segment 308, and between base 305 and the side of tab 311, can vary from 45 to 70 degrees. In the exemplary embodiment of FIG. 4, this angle is 60 degrees and is determined by the angle of the rotary loading arm from vertical, which in this case would be 60 degrees from the vertical (for example, see FIG. 1). For example, when this angle of the rotary loading arm and the angles indicated in FIG. 4 are used, the projection of orifice 303 in a vertical direction will intersect tab 307. This allows particles falling vertically from orifice 304 to impinge surface 309 of tab 307. Other combinations of the angle of the rotary loading arm and the angles of the template of FIG. 4 can be used if desired. Optionally, the vertical distance from orifice 304 to surface 309 of tab 307 may be increased by modifying triangular connecting segment 308 into a partial rhomboid to increase the distance from dashed line 315 to orifice 304.

The dimensions and bending angles used in fabricating this exemplary particle dispersal assembly can be varied as needed to accommodate different sizes and shapes of material, different orifice sizes, and different loading arm angles without departing from the scope of the invention. Other shapes and fabrication methods are possible within the particle dispersal requirements described herein. For example, more than two tabs optionally could be used in a particle dispersal assembly. In this option, tab 311 of FIG. 4 could be bent to form a second angled tab opposite and below tab 307, and a third vertical tab could be attached to the back of triangular connecting segment 308. Falling particles then would be deflected in turn by tab 307 and the new tab bent from tab 311, with final dispersion being effected by the new vertical tab attached to the back of triangular connecting segment 308.

Figure 6:
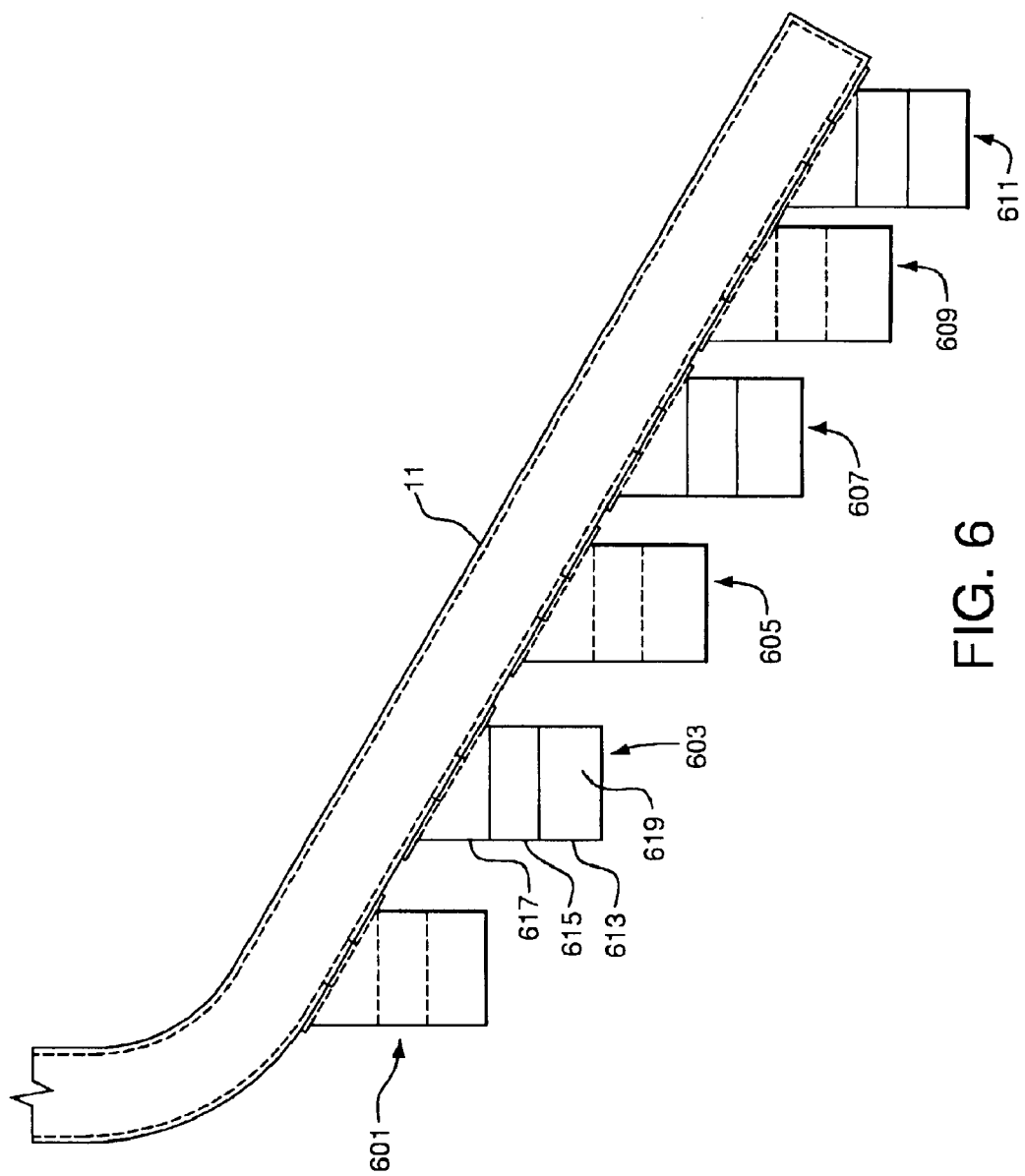
FIG. 6 is an illustration of a rotary arm showing orifices and particle dispersal assemblies in an embodiment of the present invention.
Figure 7:
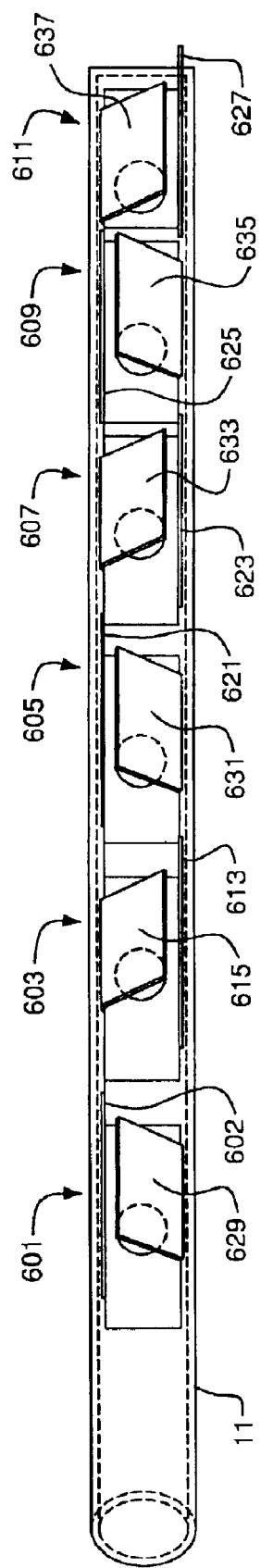
FIG. 7 is a bottom normal view of the rotary loading arm of FIG. 6.
Figure 8:
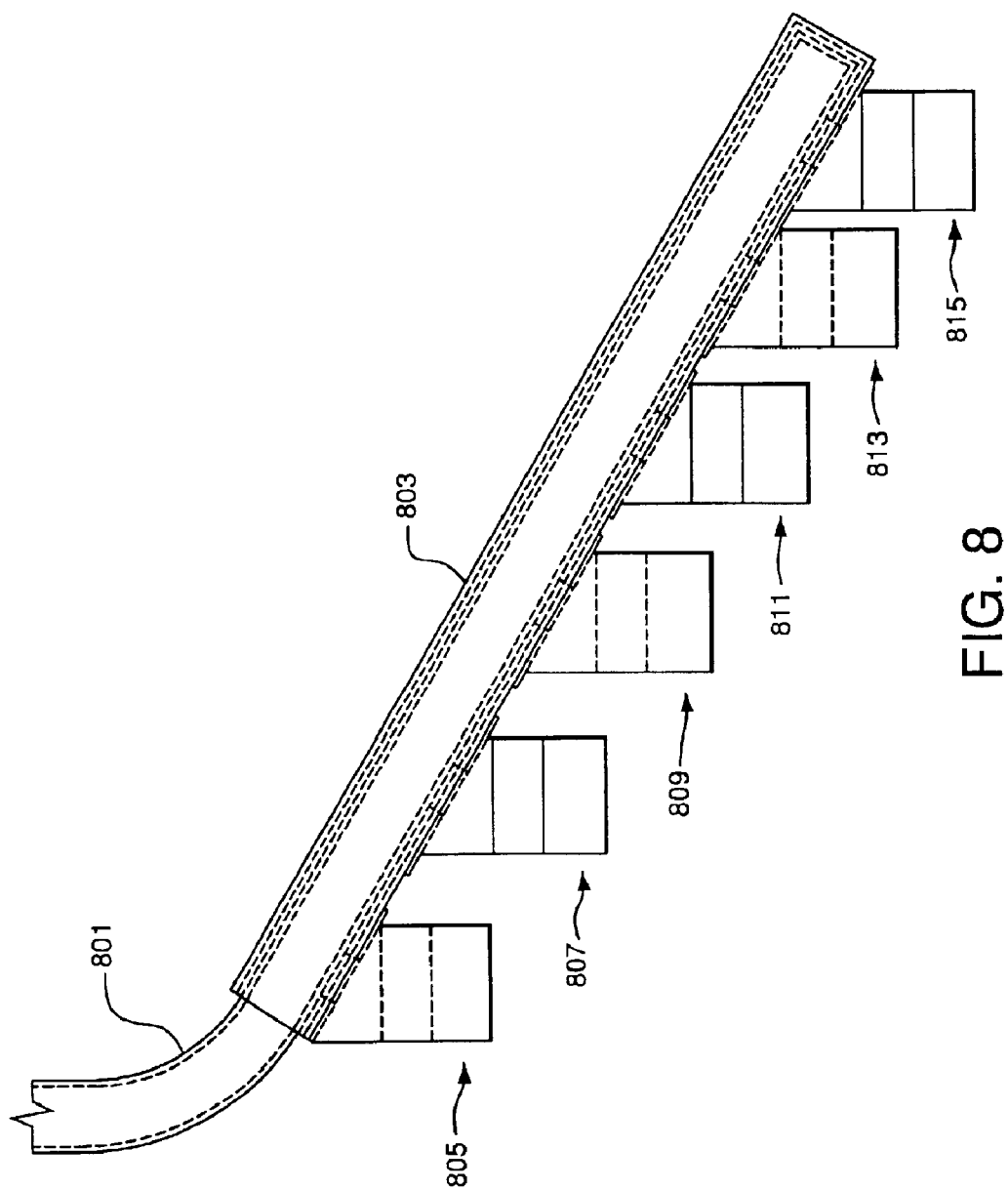
FIG. 8 is an illustration of an alternative rotary loading arm having a coaxial control pipe with orifices and particle dispersal assemblies for controlling particle flow.

Multiple dispersing tabs may be fabricated, in whole or in part, from one or more exemplary templates similar to that shown in FIG. 5; the dimensions and orientation of the components in this figure are not necessarily to scale. The example template of FIG. 5 is designed to provide dispersing tabs for multiple orifices wherein the tabs alternate in orientation along a rotary loading arm having six orifices. Dispersing tabs 501 for the first, third, and fifth orifices may be formed by bending the template along dashed line 509 in an analogous fashion to that discussed for FIG. 4. Dispersing tabs 505 for the second, fourth, and sixth orifices may be formed in like manner by bending along dashed line 511. Separate deflecting tabs analogous to tab 307 of FIG. 4 can be fabricated and attached (not shown) opposite each of dispersing tabs 501 at edges 515 and opposite dispersing tabs 505 at edges 513. The final assembly then can be attached to the conduit of the rotary loading arm as described with reference to FIG. 4.

Rotary loading arm 11 of FIG. 1 is illustrated in more detail in FIG. 6. Six particle dispersal assemblies 601-611 are shown attached to the pipe which forms rotary loading arm 11. The assemblies may be oriented in alternating front-facing and rear-facing fashion as shown to minimize the interference of the falling streams of particles from adjacent assemblies. Particle dispersal assemblies 603, 607, and 611 are shown in front view similar to the view of FIG. 3B. Particle dispersal assembly 603, for example, shows tab 613, which lies partially behind tab 615 and triangular connecting segment 617, and a portion of dispersing surface 619, which is seen in normal view. Particle dispersal assemblies 601, 605, and 609 are shown in rear view. Particles flow through the interior of rotary loading arm 11, through the congruent or overlapping orifices in the bottom of the arm and the particle dispersal assemblies, and are deflected and dispersed as earlier described.

The orifices and associated particle dispersal assemblies preferably should be spaced along each loading arm so that the density of the falling particles is uniform across the vessel cross-section. When the orifices are equally-sized, this criterion typically results in a spacing between adjacent particle dispersal assemblies which decreases as the radial distance from the vessel center increases. Alternatively, the spacing between adjacent particle dispersal assemblies may be constant, in which case the orifice sizes would increase as the radial distance from the vessel center increases. Any combination of orifice sizes and spacing between adjacent particle dispersal assemblies may be used as long as the density of the falling particles is uniform across the vessel cross-section.

The orifices in the embodiments described above may be of any shape but typically are circular or elliptical holes. Alternatively, the orifices may be square, rectangular, triangular, or any other shape holes. The limiting dimension of an orifice is defined as the minimum dimension which could cause particle bridging. For example, the limiting dimension of a circular orifice is the diameter, of an elliptical orifice is the length of the minor axis, of a square orifice is the length of a side, of a rectangular orifice is the length of the shorter side, and of a triangular orifice is the minimum altitude. The ratio of the limiting dimension of the orifice to the average diameter of the particles preferably is greater than about 4 and may be in the range of about 4 to about 12.

Each rotary loading arm may be formed from a length of conduit, wherein the conduit may be a pipe having a circular cross-section, a tube having a shape of any desired cross-section, a channel which is open on the upper side, or combinations thereof. The rotary loading arm preferably is self-supporting, but may include reinforcing brackets or bracing as needed. The axis of the conduit forming each rotary loading arm typically is oriented between about 45 degrees and about 70 degrees from the vertical.

The total flow resistance of the particles through the orifices on a rotary loading arm should be greater than the flow resistance through the conduit in order to effect an even distribution of the particles from the orifices. Typically, the total cross-sectional area of the orifices should be less than about 75% of the cross-sectional area of the conduit. Any burrs formed when the orifices are cut in the loading arm should be removed to promote even particle flow through all orifices.

Another view of rotary loading arm 11 is shown in FIG. 7, which is a bottom view taken perpendicular to the axis of the loading arm. The dimensions and orientation of the components in this FIG. 7 are not necessarily to scale. Particle dispersal assemblies 601-611 are seen in the same view direction as that of FIG. 3A. FIG. 7 illustrates an alternating orientation of the particle dispersal assemblies, which may be used to minimize the interference of the falling streams of particles from adjacent assemblies. Tabs 629, 615, 631, 633, 635, and 637, which may be defined as deflecting tabs or surfaces, are disposed on alternating sides of the orifices in pipe 11. Tabs 602, 613, 621, 623, 625, and 627, which may be defined as dispersing tabs or surfaces, are disposed on alternating sides of the orifices in pipe 11. A stream of particles from particle dispersal assembly 601, for example, would be dispersed from tab 602 (seen in edge view) in a plane which is laterally offset from the plane of particles dispersed from tab 613 (seen in edge view) of particle dispersal assembly 603. This results in a more even distribution of falling particles than if particle dispersal assemblies 601–611 were all oriented in the same direction. This alternating orientation of the particle dispersal assemblies may be described geometrically such that a plane tangent to the deflecting surface of any particle dispersal assembly intersects a plane tangent to the deflecting surface of an adjacent particle dispersal assembly at an included angle of between about 60 and about 90 degrees.

The particle dispersal assemblies of FIG. 7 show dispersing tabs 602, 613, 621, 623, 625, and 627 oriented such that the tabs lie in planes which are generally parallel to the axis of the rotary loading arm. Alternative orientations may be used wherein the particle dispersal assemblies are rotated about the orifice centerlines such that these tabs lie in planes which are not parallel to the axis of the rotary loading arm. For example, the particle dispersal assemblies may be rotated about the orifice centerlines such that the dispersing tabs lie in planes which are perpendicular to the axis of the rotary loading. All orientations are considered to be embodiments of the claimed invention.

An alternative embodiment of the rotary loading arm is shown in FIG. 8 that includes means for starting and stopping the flow of particles from the particle dispersal assemblies. The dimensions and orientation of the components in FIG. 8 are not necessarily to scale. In this embodiment, the rotary loading arm includes first pipe 801, which is in particle flow communication with a particle storage hopper (not shown), and second pipe 803, which is disposed coaxially and rotatably around the lower portion of first pipe 801. Particle dispersal assemblies 805–815 are attached in alternating directions to second pipe 803 and are analogous to particle dispersal assemblies 601–611 of FIG. 6. Pipes 801 and 803 each may have six orifices similarly located which are superimposed or overlapping when the pipes are in a first or open position as shown in FIG. 8. In this position, particles can flow freely from the inner pipe and through the overlapping orifices to particle dispersal assemblies 805–815. To terminate the flow of particles, pipe 803 is rotated coaxially to a closed position in which the orifices are circumferentially offset so that the inner wall of pipe 803 blocks the orifices in pipe 801.

Pipes 801 and 803 are fitted with stops (not shown) at the upper end of outer pipe 803 to ensure that orifices in the two pipes are located at the proper axial distances from the upper end of outer pipe 803 so that the orifices overlap or are superimposed in the open position. Stops also are provided (not shown) to align the radial orientation of pipe 803 relative to pipe 801 so that the orifices overlap in the open position and do not overlap in the closed position.

Particle loading can proceed by loading particles into the particle storage hopper while pipe 803 is in the closed position, rotating pipe 803 to the open position and starting rotation of the loading arms, loading particles into the vessel to the required bed depth, and terminating loading by moving pipe 803 to the closed position and stopping rotation of the loading arms.

The particle flow control method described above is important because it allows particle flow to commence simultaneously from all orifices, which is important in depositing an even flow of particles across the surface of the bed being formed. Likewise, the method allows the simultaneous termination of particle flow from all orifices, which is important for the same reason. Another alternative, which is less preferable, is to shut off particle flow at the upper ends of the conduits forming the rotary arms (i.e., below bottom cylindrical section 7 of FIG. 1). This is less preferable because the final flow of residual particles through the orifices in the rotary arms will be uneven.

While the embodiments of the described above utilize planar tabs for the deflecting and dispersing surfaces of the particle dispersal assemblies, these surfaces may be curved or non-planar if desired. For example, concave or convex deflecting and dispersing surfaces could be used and would be embodiments of the present invention. While the tabs are shown as having rectangular sections, the tabs can be of any shape as long as the proper deflection and dispersion of particles are achieved.

In the embodiment described above, each particle dispersal assembly utilizes two surfaces, a deflecting surface and a dispersing surface, to distribute particles during loading. In an alternative embodiment of the invention, some or all of the particle dispersal assemblies may use only one surface each to simplify fabrication of the rotary loading arm. For example, tab 311 of FIGS. 3A, 3B, and 3C may be eliminated, leaving only tab 307 to deflect and disperse particles. Alternatively, embodiments can be envisioned in which more than two tabs or surfaces could be used to deflect and disperse particles. The scope of the present invention embraces all of these alternative embodiments which use one or more tabs or surfaces to distribute particles flowing from orifices.

Figure 9:
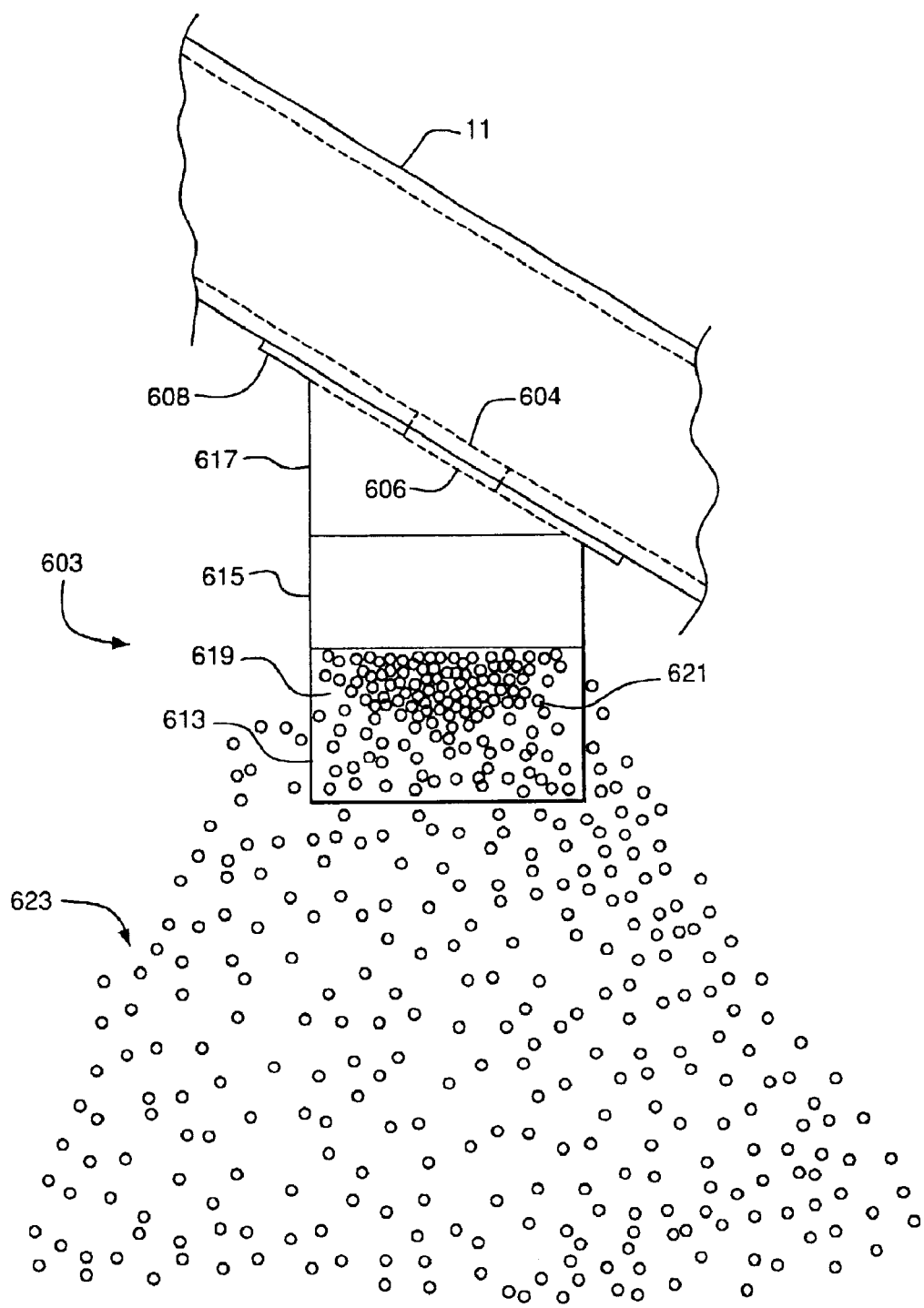
FIG. 9 is an illustration of particle dispersion by a particle dispersal assembly of the embodiment of FIG. 6.

An illustration of particle dispersion by an embodiment of the invention is given in FIG. 9, which includes an enlarged view of particle dispersal assembly 603 and pipe 11 of FIG. 6. The dimensions and orientation of the components in FIG. 9 are not necessarily to scale. Particle dispersal assembly 603 includes tab 613, which is partially behind tab 615 and triangular connecting segment 617, and a portion of dispersing surface 619, which is seen in normal view. Orifice 604 in pipe 11 is superimposed or congruent with orifice 606 of base 608. Particles flow through the interior of pipe 11, through orifices 604 and 606, and fall in a generally vertical direction behind connecting segment 617. The particles impinge on the deflecting surface on the back side of tab 615 and flow through the gap between tab 615 and dispersing surface 619, where they are deflected to form concentrated particle stream 621, which in turn impinges on dispersing surface 619 of tab 613. This disperses concentrated particle stream 621 into fan-shaped particle stream 623 as shown. Pipe 11 is part of a loading arm which has a plurality of particle dispersal assemblies and rotates in the vessel as earlier described, thereby distributing a plurality of uniformly-falling fan-shaped particle streams to the surface of the bed of particles (not shown). This distribution method yields a dense and uniform bed of particles as earlier described.

The following Example illustrates the present invention but does not limit the invention to any of the specific details described therein.

EXAMPLE

A particle distribution system similar to that illustrated in FIG. 2 was fabricated using the particle dispersal assemblies as illustrated in FIGS. 3A, 3B, and 3C and the particle flow control assembly shown in FIG. 8. The loading arm system comprised two inner pipes (similar to inner pipe 801 of FIG. 8) fabricated from 2½" diameter schedule 10 304 stainless steel with a length of 38 inches from the outer ends to the bends near the vessel axis. One inner pipe had 9 orifices of 15/32nds inch diameter and the other had 10 orifices of 15/32nds inch diameter, both on the underside of the arms located along the arms such that the distance between orifices decreased with radial distance from the vessel axis as illustrated in FIG. 8.

Figure 5:
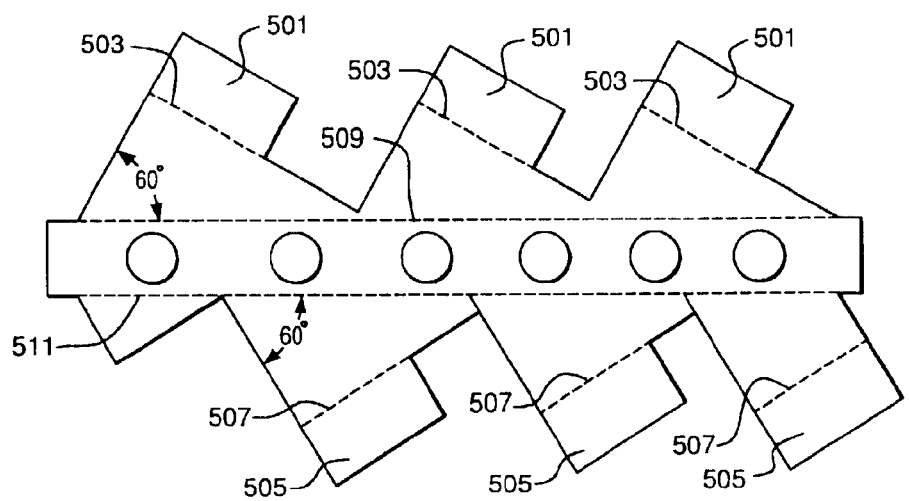
FIG. 5 is a diagram of a template for fabrication of multiple particle dispersal assemblies.

Individual deflector tabs were cut from sheet steel 0.060 inches thick according to the templates shown in FIGS. 4 and 5 and were bent to form the particle dispersal assemblies as illustrated in FIGS. 3A, 3B, 3C and 7. These assemblies were specifically designed to be mounted on distribution arms inclined 60 degrees from the vertical.

Two larger pieces of 3" outside diameter schedule 18 304 stainless steel pipe (similar to pipe 803 of FIG. 8) were fabricated having orifices of similar diameter, spacing, and orientation as the inner pipes described above. The particle dispersal assemblies were tack welded over the orifices on the larger pipes using the alternating orientations illustrated in FIG. 7 and were fitted coaxially over the smaller pipes as illustrated in FIG. 8 to form completed loading arms. The loading arms were oriented at 60 degrees from the vertical and were designed to fill a vessel having an inside diameter of 72 inches. The vessel contained an annular bed as described below.

The loading assembly as described in FIG. 2, with the loading arms disconnected, was situated on the top of the vessel to be filled. Each of the rotary loading arms was maneuvered between supports 15 into the interior of the vessel and connected to bottom cylindrical section 207. The outer pipes could be rotated to open or block the orifices on the inner pipes of the loading arms.

In this Example, 3,775 pounds of 1.5 mm diameter LiNaKLSX adsorbent particles were to be loaded into the annular space of the vessel, which had a bed height of 45.5 inches, inner radius of the annular space of 7.75 inches and outer radius of the annular space of 32.75 inches. In this Example, there was a single annular bed rather than the two annular beds in FIG. 2. The vessel was fitted with inner coaxial cylindrical bed support screen or partition 229 with an outer diameter of 7.75 inches and outer coaxial cylindrical bed support screen or partition 227 with an inner diameter of 32.75 inches. In this Example, arm 215 had particle dispersal assemblies (similar to particle dispersal assemblies 223) along its length between inner bed support screen or partition 229 and outer coaxial cylindrical bed support screen or partition 227. Likewise, arm 217 had particle dispersal assemblies (similar to particle dispersal assemblies (231) along its length between inner bed support screen or partition 229 and outer coaxial cylindrical bed support screen or partition 227.

The particles were loaded at a predetermined rate from '55 gallon drums into particle hopper storage means 201 which includes cylindrical hopper 203, frusto-conical intermediate section 205, and bottom cylindrical section 207 of FIG. 2. Internal separating partition 213 was not used in this Example. Rotation of the particle hopper/loading arm assembly was initiated at 1 RPM, the outer pipes were rotated to align the orifices with those of the inner pipes, and particle loading commenced.

After 120 minutes of loading operation, a total of 3,775 pounds of adsorbent particles had been loaded into the vessel and loading was complete. Rotary loading arms 215 and 217 were detached from bottom cylindrical section 207 and maneuvered out of the vessel between supports 15, and the vessel was ready to be prepared for operation in a pressure swing adsorption process.

What is claimed is:

1. An apparatus for dispersing particles flowing from an orifice comprising a deflecting surface disposed relative to the orifice, wherein the deflecting surface is fixed relative to the orifice, whereby particles flowing from the orifice can impinge upon and can be dispersed by the deflecting surface, wherein the orifice is one of a plurality of orifices disposed in a wall of a conduit, and wherein the conduit has an axis which is oriented between about 45 degrees and about 70 degrees from the vertical such that particles can flow through the conduit and through the orifices by gravity.

2. An apparatus for loading particles into a vessel comprising
   (a) particle hopper storage means;
   (b) at least one rotary loading arm comprising a conduit having a first end and a second end, wherein the first end is in particle flow communication with the particle hopper storage means, and wherein a portion of the conduit has a plurality of orifices disposed between the first and the second end;
   (c) a plurality of particle dispersal assemblies, each particle dispersal assembly being disposed adjacent to an orifice, wherein each particle dispersal assembly comprises a deflecting surface which is fixed relative to the orifice such that particles flowing from the orifice can impinge upon and can be dispersed by the deflecting surface; and
   (d) drive means for rotating the at least one rotary loading arm.

3. The apparatus of claim 2 wherein each particle dispersal assembly further comprises a dispersing surface disposed adjacent to the orifice such that the projection of the orifice does not intersect the deflecting surface, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface.

4. The apparatus of claim 3 wherein the deflecting and dispersing surfaces are planar.

5. The apparatus of claim 4 wherein the axis of the conduit at the location of any of the plurality of orifices forms an included angle with the plane of the deflecting surface of between about 20 and about 45 degrees.

6. The apparatus of claim 4 wherein each deflecting and dispersing surface is attached to the portion of conduit adjacent to an orifice.

7. The apparatus of claim 2 wherein the axis of the conduit is oriented between about 45 degrees and 70 degrees from the vertical.

8. The apparatus of claim 2 which comprises two diametrically opposed rotary loading arms.

9. The apparatus of claim 2 wherein the conduit is selected from the group consisting of a pipe, a tube, a channel, and combinations thereof.

10. The apparatus of claim 2 which further comprises control means for controlling the rotation rate of the rotary loading arm.

11. The apparatus of claim 2 wherein the hopper storage means is a storage assembly comprising a cylindrical vessel with an attached frusto-conical bottom section having a bottom cylindrical section attached thereto, and wherein the rotary loading arm is attached to the bottom cylindrical section such that the drive means rotates both the rotary loading arm and the storage assembly.

12. A method for loading particles into a vessel comprising
   (a) providing a particle storage hopper containing the particles;
   (b) providing at least one rotary loading arm comprising a conduit having a first end and a second end, wherein the first end is in particle flow communication with the particle storage hopper, and wherein a portion of the conduit has a plurality of orifices disposed between the first and the second end;
   (c) providing a plurality of particle dispersal assemblies, each particle dispersal assembly being disposed adjacent to an orifice; wherein each particle dispersal assembly comprises
      (1) a deflecting surface disposed adjacent to the orifice, whereby particles flowing from the orifice can impinge upon and can be deflected by the deflecting surface; and
      (2) a dispersing surface disposed adjacent to the orifice, wherein a plane tangent to any point on the deflecting surface and a plane tangent to any point on the dispersing surface intersect at an included angle of between about 30 degrees and about 60 degrees;
   (d) flowing the particles through the rotary loading arm to the orifices, flowing the particles through the orifices, flowing particles vertically from the orifices, impinging at least a portion of the particles upon the deflecting surfaces, dispersing the particles from the deflecting surfaces, and further dispersing from the dispersing surfaces at least a portion of the particles dispersed from the deflecting surfaces; and
   (e) rotating the at least one rotary loading arm to distribute the particles in the vessel to form a bed of particles therein.

13. The method of claim 12 wherein the at least one rotary loading arm is rotated about the vessel axis.

14. The method of claim 12 wherein the at least one rotary loading arm is rotated at between about 0.5 and 5 revolutions per minute.

15. The method of claim 12 wherein following the completion of loading the bed of particles a portion of the particles are removed from the surface of the bed by vacuuming to level the bed surface.

16. The method of claim 12 wherein following the completion of loading the bed of particles additional particles are dispersed onto the surface of the bed by hand sifting.

17. An apparatus for controlling the loading of particles into a vessel comprising
   (a) particle hopper storage means;
   (b) at least one rotary loading arm comprising a first section of pipe having a first end and a second end, wherein the first end is in particle flow communication with the particle hopper storage means, and wherein the first section of pipe has a plurality of orifices disposed between the first and the second end;
   (c) a second section of pipe having an inner diameter larger than the outer diameter of the first section of pipe, wherein the second section of pipe is disposed coaxially and rotatably over the first section of pipe and has a plurality of orifices, wherein
      (1) in a first coaxial position the orifices in the second section of pipe are oriented relative to the orifices in the first section of pipe such that particles can flow through overlapping pairs of orifices in the first and second sections of pipe; and
      (2) in a second coaxial position the orifices in the second section of pipe are oriented relative to the orifices in the first section of pipe such that the orifices in the first section of pipe are blocked by the second section of pipe such that particles cannot flow through the orifices in the first section of pipe;
   (d) a plurality of particle dispersal assemblies, each particle dispersal assembly being attached to the second section of pipe adjacent to an orifice; and
   (e) drive means for rotating the rotary loading arm to disperse the particles in the vessel.

18. The apparatus of claim 17 wherein each particle dispersal assembly comprises
   (1) a deflecting surface disposed adjacent to the orifice, wherein the deflecting surface is fixed relative to the orifice, whereby particles flowing vertically from the orifice can impinge upon and can be dispersed by the deflecting surface; and
   (2) a dispersing surface disposed adjacent to the orifice such that the projection of the orifice does not intersect the deflecting surface, wherein a plane tangent to any point on the deflecting surface and a plane tangent to any point on the dispersing surface intersect at an included angle of greater than about 30 degrees and less than about 60 degrees,
whereby particles can be dispersed by the deflecting surface and at least a portion of the particles dispersed from the deflecting surface can impinge upon the dispersing surface and be dispersed by the dispersing surface.

19. A method for controlling the loading of particles into a vessel comprising
   (a) providing a particle storage hopper;
   (b) providing at least one rotary loading arm comprising a first section of pipe having a first end and a second end, wherein the first end is in particle flow communication with the particle storage hopper, and wherein the first section of pipe has a plurality of orifices disposed between the first and the second end;
   (c) providing a second section of pipe having an inner diameter larger than the outer diameter of the first section of pipe, wherein the second section of pipe is disposed coaxially and rotatably over the first section of pipe and has a plurality of orifices, wherein
      (1) in a first coaxial position, the orifices in the second section of pipe are oriented adjacent to the orifices in the first section of pipe such that particles can flow through overlapping pairs of orifices in the first and second sections of pipe; and
      (2) in a second coaxial position, the orifices in the second section of pipe are oriented adjacent to the orifices in the first section of pipe such that the orifices in the first section of pipe are blocked by the second section of pipe such that particles cannot flow through the orifices in the first section of pipe;
   (d) providing plurality of particle dispersal assemblies, each particle dispersal assembly being attached to the second section of pipe adjacent to an orifice;
   (e) placing the first and second sections of pipe in the first coaxial position, thereby initiating flow of particles from the particle storage hopper through the first section of pipe, through the orifices in the first and second sections of pipe, and through the particle dispersal assemblies, and rotating the at least one rotary loading arm, thereby loading the particles into the vessel; and
   (f) placing the first and second sections of pipe in the second coaxial position, thereby terminating flow of particles into the vessel.

20. The method of claim 19 wherein each particle dispersal assembly comprises
   (1) a deflecting surface disposed adjacent to the orifice, wherein the deflecting surface is fixed relative to the orifice, whereby particles flowing vertically from the orifice can impinge upon and can be dispersed by the deflecting surface; and
   (2) a dispersing surface disposed relative to the orifice, wherein a plane tangent to any point on the deflecting surface and a plane tangent to any point on the dispersing surface intersect at an included angle of greater than about 30 degrees and less than about 60 degrees, whereby at least a portion of the particles which are dispersed by the deflecting surface impinge upon and are further dispersed by the dispersing surface.

21. An apparatus for loading particles into a vessel to form at least two annular beds containing different types of particles, the apparatus comprising:
   (a) first particle hopper storage means containing a first type of particle;
   (b) second particle hopper storage means containing a second type of particle;
   (c) a first rotary loading arm comprising
      (1) a first conduit section having a first end and a second end, wherein the first end is in particle flow communication with the first particle hopper storage means and is disposed adjacent to the axis of the vessel, wherein the first conduit section has a plurality of orifices disposed between the second end and an intermediate point on the first conduit section, and wherein the intermediate point on the first conduit section is located at a selected radial distance from the vessel axis;

(2) a plurality of particle dispersal assemblies, each particle dispersal assembly being disposed adjacent to an orifice in the first conduit section;

(d) a second rotary loading arm comprising
  (1) a second conduit section having a first end and a second end, wherein the first end is in particle flow communication with the second particle hopper storage means and is disposed adjacent to the axis of the vessel, wherein the second conduit section has a plurality of orifices disposed between the first end and an intermediate point on the second conduit section, and wherein the intermediate point on the second conduit section is located at the selected radial distance from the vessel axis, and
  (2) a plurality of particle dispersal assemblies, each particle dispersal assembly being disposed adjacent to an orifice in the second conduit; and (e) drive means for rotating the rotary loading arms to disperse the particles to form within the vessel a first annular bed containing the first type of particle and a second annular bed containing the second type of particle.

22. The apparatus of claim 21 wherein each particle dispersal assembly comprises
  (1) a deflecting surface disposed adjacent to the, whereby particles can flow vertically from the orifice, can impinge upon the deflecting surface, and can be dispersed by the deflecting surface; and
  (2) a dispersing surface disposed adjacent to the orifice, wherein a plane tangent to any point on the deflecting surface and a plane tangent to any point on the dispersing surface intersect at an included angle of between about 30 degrees and about 60 degrees, whereby at least a portion of the particles dispersed by the deflecting surface can impinge upon and be further dispersed by the dispersing surface.

23. The apparatus of claim 21 wherein the axes of the first and second conduit sections are oriented between about 45 degrees and about 70 degrees from the vertical.

24. The apparatus of claim 21 wherein the first and second rotary loading arms are diametrically opposed.

25. The apparatus of claim 21 which further comprises an additional particle dispersal assembly disposed on the first conduit section adjacent to the intermediate point on the first conduit section and between the intermediate point on the first conduit section and the axis of the vessel.

26. The apparatus of claim 21 which further comprises an additional particle dispersal assembly disposed on the second conduit section adjacent to the intermediate point on the second conduit section and between the intermediate point on the second conduit section and the inner wall of the vessel.

27. A rotary loading arm for loading particles into a vessel comprising
  (a) a conduit section having a first end and a second end, wherein the first end is in particle flow communication with a supply of particles and is disposed adjacent to the axis of the vessel, wherein the second end is disposed adjacent to an inner wall of the vessel, and wherein the conduit has a plurality of orifices disposed between the first end and the second end; and
  (b) a plurality of particle dispersal assemblies, each particle dispersal assembly being disposed adjacent to an orifice in the conduit section; wherein each particle dispersal assembly comprises a deflecting surface disposed relative to the orifice such that particles can flow from vertically from the orifice can be dispersed by the deflecting surface;
wherein a plane tangent to the deflecting surface of any particle dispersal assembly intersects a plane tangent to the deflecting surface of an adjacent particle dispersal assembly at an included angle of between about 60 and about 90 degrees.

* * * * *